US009116610B2

(12) United States Patent
Yoritate et al.

(10) Patent No.: US 9,116,610 B2
(45) Date of Patent: *Aug. 25, 2015

(54) IMAGING APPARATUS AND USER INTERFACE

(71) Applicant: Sony Corporation, Tokyo (JP)

(72) Inventors: Miwako Yoritate, Tokyo (JP); Motoki Kobayashi, Tokyo (JP); Yoshimitsu Funabashi, Tokyo (JP); Shinichi Iriya, Kanagawa (JP); Kayo Sasaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,774

(22) Filed: Apr. 8, 2014

(65) Prior Publication Data

US 2014/0289676 A1 Sep. 25, 2014

Related U.S. Application Data

(63) Continuation of application No. 13/483,842, filed on May 30, 2012, now Pat. No. 8,732,580, which is a continuation of application No. 11/568,774, filed as application No. PCT/JP2005/008653 on May 2, 2005, now Pat. No. 8,214,739.

(30) Foreign Application Priority Data

May 13, 2004 (JP) ................................. 2004-143437

(51) Int. Cl.
*G06F 3/0485* (2013.01)
*H04N 1/00* (2006.01)
(Continued)

(52) U.S. Cl.
CPC .......... *G06F 3/0485* (2013.01); *G06F 3/04842* (2013.01); *H04N 1/00442* (2013.01);
(Continued)

(58) Field of Classification Search
CPC .......... H04N 1/00458; H04N 1/00442; H04N 1/0453; H04N 2101/00; H04N 5/772; H04N 5/23293
USPC .......................... 715/830, 716, 730, 704, 828; 348/333.02
See application file for complete search history.

(56) References Cited

U.S. PATENT DOCUMENTS 5,943,050 A 8/1999 Bullock et al.
6,515,704 B1 2/2003 Sato
(Continued)

FOREIGN PATENT DOCUMENTS

CN 1363181 A 8/2002
CN 1398111 A 2/2003
(Continued)

OTHER PUBLICATIONS

Office Action issued Sep. 6, 2011, in Japanese Patent Application No. 2004-143437 filed May 13, 2004.
(Continued)

*Primary Examiner* — Antoinette Spinks
(74) *Attorney, Agent, or Firm* — Oblon, McClelland, Maier & Neustadt, L.L.P.

(57) ABSTRACT

A screen ST1 of an LCD with which a digital camera is provided displays an icon of a folder F1 indicating that the folder F1 has been selected. Image files P11 and P12 are captured reproduced images. A display frame SC displays a currently captured picture of an object, files P11 and P12, and the icon of the folder F1. To switch the folder F1 to a folder F2, the user presses a down button of a cross key 27. When the user presses the down button on the screen ST1, the screen ST1 is switched to a screen ST3 through a screen ST2. On the screen ST2, the number denoted in the icon is changed. The screen ST2 displays a state of which the folders are being switched. An icon displayed on the screen ST3 indicates that the folder F1 was switched to the folder F2.

19 Claims, 11 Drawing Sheets

(51) Int. Cl.
*H04N 5/232* (2006.01)
*H04N 5/77* (2006.01)
*G06F 3/0484* (2013.01)
*H04N 101/00* (2006.01)

(52) U.S. Cl.
CPC ....... *H04N1/00448* (2013.01); *H04N 1/00453* (2013.01); *H04N 1/00458* (2013.01); *H04N 5/23293* (2013.01); *H04N 5/772* (2013.01); *H04N 2101/00* (2013.01)

(56) References Cited

U.S. PATENT DOCUMENTS

| | | | |
|---|---|---|---|
| 6,532,039 B2 | 3/2003 | Anderson | |
| 6,833,863 B1 | 12/2004 | Clemens | |
| 6,928,613 B1 | 8/2005 | Ishii et al. | |
| 6,990,637 B2 | 1/2006 | Anthony et al. | |
| 7,299,417 B1 | 11/2007 | Barris et al. | |
| 7,437,681 B2 | 10/2008 | Misawa et al. | |
| 7,443,418 B2 | 10/2008 | Bryant et al. | |
| 7,665,021 B2 | 2/2010 | Randall et al. | |
| 2002/0063797 A1* | 5/2002 | Aratani et al. | 348/553 |
| 2003/0011683 A1 | 1/2003 | Yamasaki et al. | |
| 2003/0154190 A1 | 8/2003 | Misawa et al. | |
| 2003/0167447 A1 | 9/2003 | Hatta et al. | |
| 2004/0022522 A1 | 2/2004 | Terada | |
| 2004/0027465 A1 | 2/2004 | Smith et al. | |
| 2004/0061791 A1 | 4/2004 | Terada | |
| 2004/0172440 A1 | 9/2004 | Nakajima et al. | |
| 2005/0005083 A1 | 1/2005 | Ozdemir et al. | |
| 2005/0091596 A1* | 4/2005 | Anthony et al. | 715/712 |

FOREIGN PATENT DOCUMENTS

| | | |
|---|---|---|
| CN | 1458565 A | 11/2003 |
| CN | 1476231 A | 2/2004 |
| JP | 4-280376 | 10/1992 |
| JP | 8-263255 | 10/1996 |
| JP | 2000-82048 | 3/2000 |
| JP | 2001-92444 | 4/2001 |
| JP | 2001-147848 | 5/2001 |
| JP | 2001-148004 | 5/2001 |
| JP | 2001-169222 | 6/2001 |
| JP | 2001-203973 | 7/2001 |
| JP | 2002-211049 | 7/2002 |
| JP | 2003-092719 | 3/2003 |
| JP | 2003-108974 | 4/2003 |
| JP | 2003-298982 | 10/2003 |
| JP | 2003-319296 A | 11/2003 |
| JP | 2004-12633 | 1/2004 |
| JP | 2004-30621 | 1/2004 |
| JP | 2004-40370 | 2/2004 |
| JP | 2004-120225 | 4/2004 |
| JP | 2004-120420 | 4/2004 |
| JP | 2004-215157 | 7/2004 |
| JP | 2004-241815 | 8/2004 |
| JP | 2005-39600 | 2/2005 |
| JP | 2005-165767 | 6/2005 |
| WO | 98/52120 | 11/1998 |

OTHER PUBLICATIONS

Office Action issued Sep. 6, 2011, in Japanese Patent Application No. 2009-190597 filed Aug. 20, 2009.
Office Action issued Aug. 17, 2010, in Japanese Patent Application No. 2004-143437 filed May 13, 2004.
Office Action issued Aug. 17, 2010, in Japanese Patent Application No. 2009-190596 filed Aug. 20, 2009.
Office Action issued Aug. 17, 2010, in Japanese Patent Application No. 2009-190597 filed Aug. 20, 2009.
Combined Office Action and Search Report issued Sep. 29, 2012 in Chinese Application No. 200910173741.9 (With English Translation).
Summons to Attend Oral Proceedings Pursuant to Rule 115(1) EPC issued Jul. 2, 2013 in European Patent Application No. 05738501.5.

* cited by examiner

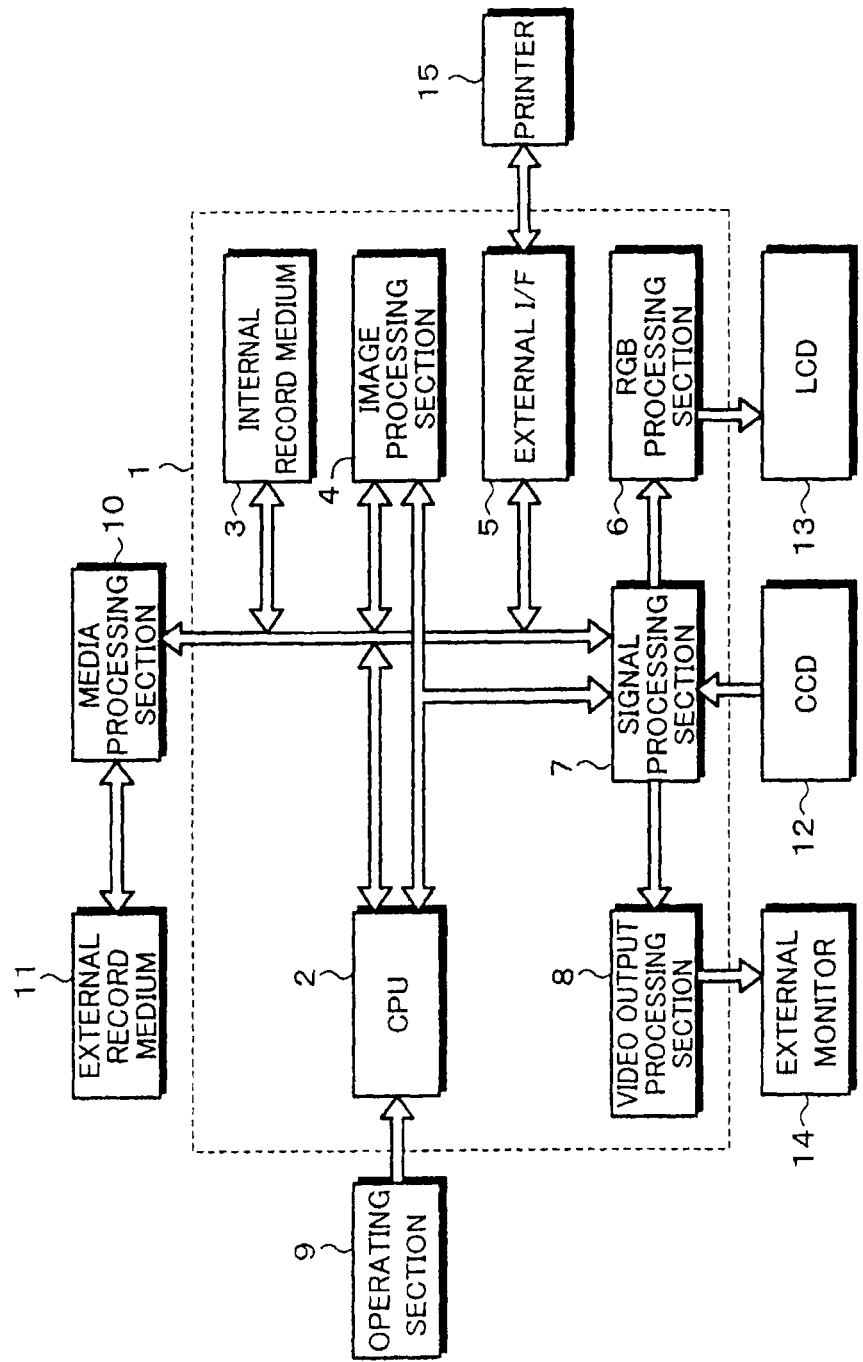

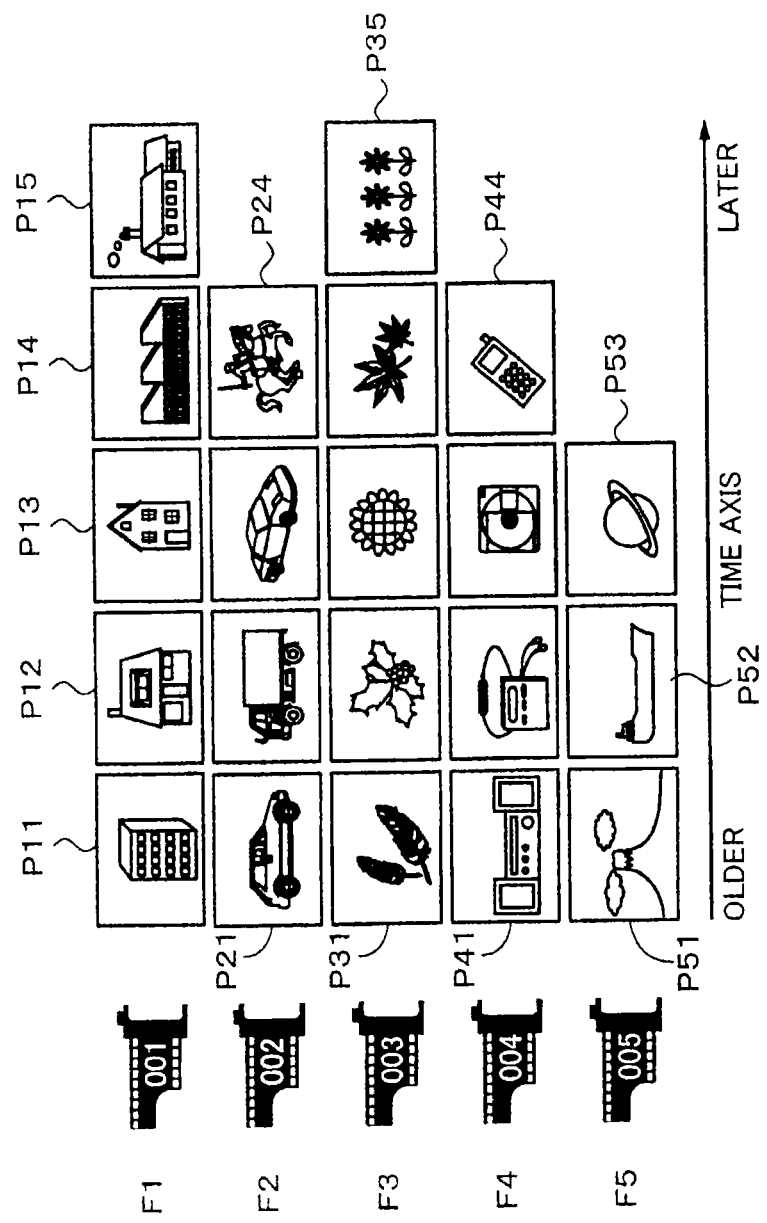

IMAGING APPARATUS AND USER INTERFACE

CROSS REFERENCE TO RELATED APPLICATIONS

This application is a continuation application of U.S. patent application Ser. No. 13/483,842 filed on May 30, 2012, which is a continuation application of U.S. patent application Ser. No. 11/568,774, filed on Nov. 7, 2006, the entire contents of both of which are incorporated herein by reference. U.S. patent application Ser. No. 11/568,774 is the National Stage of PCT/JP05/08653, filed on May 2, 2005, which claims priority to Japanese Patent Application No. 2004-143437, filed on May 13, 2004.

TECHNICAL FIELD

The present invention relates to an imaging apparatus and a user interface applicable to for example a digital still camera.

BACKGROUND ART

A format of image files used for digital still cameras and related devices is defined in specifications called DCF (Design rule for Camera File). Since the common format is used, image files can be easily exchanged between digital still cameras.

In this specifications, a directory DCIM immediately below a root directory is called a DCF image directory. Placed immediately below the directory DCIM are a plurality of directories which store DCF objects. These directories are called DCF directories. The DCF directories are directories which store images generated according to rules about the directories of DCF. Hereinafter, the DCF directories are called folders. DCF objects are a group of files generated according to the rules of DCF. Hereinafter, the DCF objects are called image files.

For example, Japanese Patent Application Unexamined Publication No. 2003-319296 describes a technology of which images captured by a digital still camera are stored in hierarchical directories of folders, sub folders, and category folders of a memory with which the digital still camera is provided. When the power of the digital still camera is turned on, a folder is designated. When the user operates a folder switching ring and inputs a folder switching command, folders are switched. When a folder is designated, a captured image can be stored in a folder which the user wants.

When image files are stored in different folders, an image retrieval can be easily and conveniently performed later. In the foregoing unexamined publication, a folder is designated using a mechanical rotational ring. In this case, as a problem of the related art, it is not easy to check a designated folder. Thus, it may not be said that switching operability of folders is good.

A folder switching screen may be displayed on a display device. In this case, it is necessary for the user to perform operations such as a menu startup operation and a folder selection operation. Thus, since the number of operation steps increases, it is not easy for the user to switch folders. Because of these reasons, folders are not frequently switched in digital cameras of the related art.

Therefore, an object of the present invention is to provide an imaging apparatus and a user interface which allow folders to be easily switched.

DISCLOSURE OF THE INVENTION

To solve the foregoing problem, a first aspect of the present invention is an imaging apparatus having a display device, comprising:
an input device which designates one set of two sets of up and down directions and left and right directions,
wherein the one set of two sets of up and down directions and left and right directions is designated on the input device and folders which store image files are switched at least in one of a shooting mode and a reproducing mode, and
wherein switching of folders is displayed on a screen of the display device.

A second aspect of the present invention is a user interface for an imaging device, comprising:
a display device; and
an input device which designates one set of two sets of up and down directions and left and right directions,
wherein the one set of two sets of up and down directions and left and right directions is designated on the input device and folders which store image files are switched at least in one of a shooting mode and a reproducing mode, and
wherein switching of folders is displayed on a screen of the display device.

According to the present invention, regardless of whether the current mode is a shooting mode or a reproducing mode, folders can be switched using directional keys. In addition, with one set of two sets of up and down keys and left and right keys of the directional keys, folders are switched. With the other set, image files are switched. Thus, like a file changing operation and a film feeding operation, folders and image files can be switched. Since folders can be directly switched, their operation can be simplified.

BRIEF DESCRIPTION OF DRAWINGS

FIG. 1 is a block diagram showing a structure of an imaging apparatus according to an embodiment of the present invention.

FIG. 3 is a schematic diagram describing arrangements of folders and image files according to an embodiment of the present invention.

BEST MODES FOR CARRYING OUT THE INVENTION

Figure 2A:
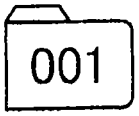
FIG. 2A is a schematic diagram describing an icon denoting a folder according to an embodiment of the present invention.

Next, with reference to the accompanying drawings, an embodiment of the present invention will be described. FIG. 1 shows an example of the structure of a digital camera according to an embodiment of the present invention. In FIG. 1, a block surrounded by broken lines denotes a processing section controlled by a CPU (Central Processing Unit) 2.

The processing section 1 is composed of an internal record medium 3 such as a RAM, an image processing section 4, an external interface 5, an RGB processing section 6, a signal processing section 7, and a video output processing section 8. Connected to the CPU 2 is an operating section 9. Signals corresponding to operations for a shutter and so forth disposed on the operating section 9 are supplied to the CPU 2.

Data of which a captured image signal is compressed according to JPEG (Joint Photographic Experts Group) or the like are recorded to an external record medium 11 through a media processing section 10. The external record medium 11 is for example a rewritable optical disc or a memory card.

Supplied to the signal processing section 7 is an image signal captured by a CCD (Charge Coupled Device) 12, which is an image sensor. The signal processing section 7 processes the captured image signal. The signal processing section 7 outputs the image signal captured by the CCD 12 regardless of whether a signal is input from the operating section 9. The image signal which is output from the signal processing section 7 is stored in the internal record medium 3. While an image is being shot, the image which is stored in the internal record medium 3 is usually updated. Data writing, data reading, and so forth of the internal record medium 3 are controlled by the CPU 2.

A captured image signal which is read from the internal record medium 3 is supplied to the RGB processing section 6 through the signal processing section 7. A display signal generated in the RGB processing section 6 is supplied to an LCD (Liquid Crystal Display) 13, which is a display device. The LCD 13 is disposed on for example a rear surface of a camera body. The LCD 13 displays not only a captured image signal, but an image signal which is read from the external record medium 11 through the media processing section 10.

When the shutter of the operating section 9 is pressed, the captured image signal stored in the internal record medium 3 is converted into an image file according to for example JPEG by the image processing section 4. The image file is stored as data different from the captured image signal by the internal record medium 3. The image file which is read from the internal record medium 3 is stored in the external record medium 11 through the media processing section 10 under the control of the CPU 2.

The captured image is usually updated and displayed on the LCD 13. The signal processing section 7 combines the captured image, reduced images of recorded image data, and OSD data such as icons. The combined image is displayed on the LCD 13. The OSD (On Screen Display) is a general term which means a memory area, a mechanism, and so forth for data such as icons superimposed with a real time image captured by a camera.

When OSD data are created, latest image data are obtained from the external record medium 11. The obtained image data are converted into a size for the OSD indication by the image processing section 4. The converted image data are stored in an OSD indication area of the internal record medium 3. When an image of the OSD indication size corresponding to the just captured image has been stored in the internal record medium 3, it is not necessary to obtain data from the external record medium 11. The image processing section 4 is controlled by the CPU 2 corresponding to user's key operation on the operating section 9 so that a size enlarging process or a size reducing process is performed for an image to be displayed.

An analog color video signal which is output from the video output processing section 8 is extracted from a video output terminal (not shown). When an external monitor 14 is connected to the video output terminal, an image stored in the internal record medium 3 or the external record medium 11 can be displayed on the external monitor 14. In addition, connected to the external interface 5 is for example a printer 15. The printer 15 can print an image.

The operating section 9 has a cross key. When tip portions (named a left button, a right button, an up button, and a down button) of the cross-shaped operation portion of the cross key are pressed, the cursor can be moved to the respective directions. Besides the cross key, as a directional key, an input device such as a dial, a roller, a track ball, or a touch panel may be used. Besides a mechanical structure, a GUI (Graphical User Interface) which allows buttons and so forth to be operated on the display screen may be used.

Figure 2B:
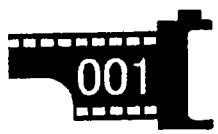
FIG. 2B is a schematic diagram describing another icon denoting a folder according to an embodiment of the present invention.

FIG. 2 shows an icon which denotes folder information according to an embodiment of the present invention and which is displayed on a screen of the LCD 13. An example shown in FIG. 2A is an icon which has an image of a folder. A user who is familiar with a computer can easily recognize the icon shown in FIG. 2A. However, it may not be said that the icon shown in FIG. 2A meets a conceptual model of a user who is accustomed to a silver salt camera. Thus, according to an embodiment of the present invention, as shown in FIG. 2B, an icon which causes a user to associate with a film is used. A film-shaped icon indicates a folder number.

FIG. 3 shows an example of user's conceptual model with respect to storing of captured images in the internal record medium 3 or the external record medium 11. The user recognizes that captured image files have been stored as shown in FIG. 3. A folder F1 stores a plurality of (for example, five) image files P11, P12, P13, P14, and P15 in the horizontal direction. The image files contain additional data such as shooting date and time. The image files are arranged from one having the oldest shooting date and time to one having the latest shooting date and time along a time axis. In FIG. 3, the right direction is a time axis direction from past to present, whereas the left direction is a time axis direction from present to past. Images arranged on one axis are displayed in the horizontal direction of the display screen of the LCD 13.

Below the folder F1, a folder F2 which stores four image files P21, . . . , and P24 is placed. Below the folder F2, folders F3, F4, and F5 are successively placed in the vertical direction. The folder F3 stores five image files P31, . . . , and P35. The folder F4 stores four image files P41, . . . , and P44. The folder F5 stores three image files P51, . . . , and P53.

The folders F1 to F5 are user's upper categories of storing of image files. The folder F1 stores image files of for example buildings; the folder F2 stores image files of for example vehicles; the folder F3 stores image files of for example flowers; the folder F4 stores image files of for example digital devices; and the folder F5 stores image files of for example scenes.

Figure 4:
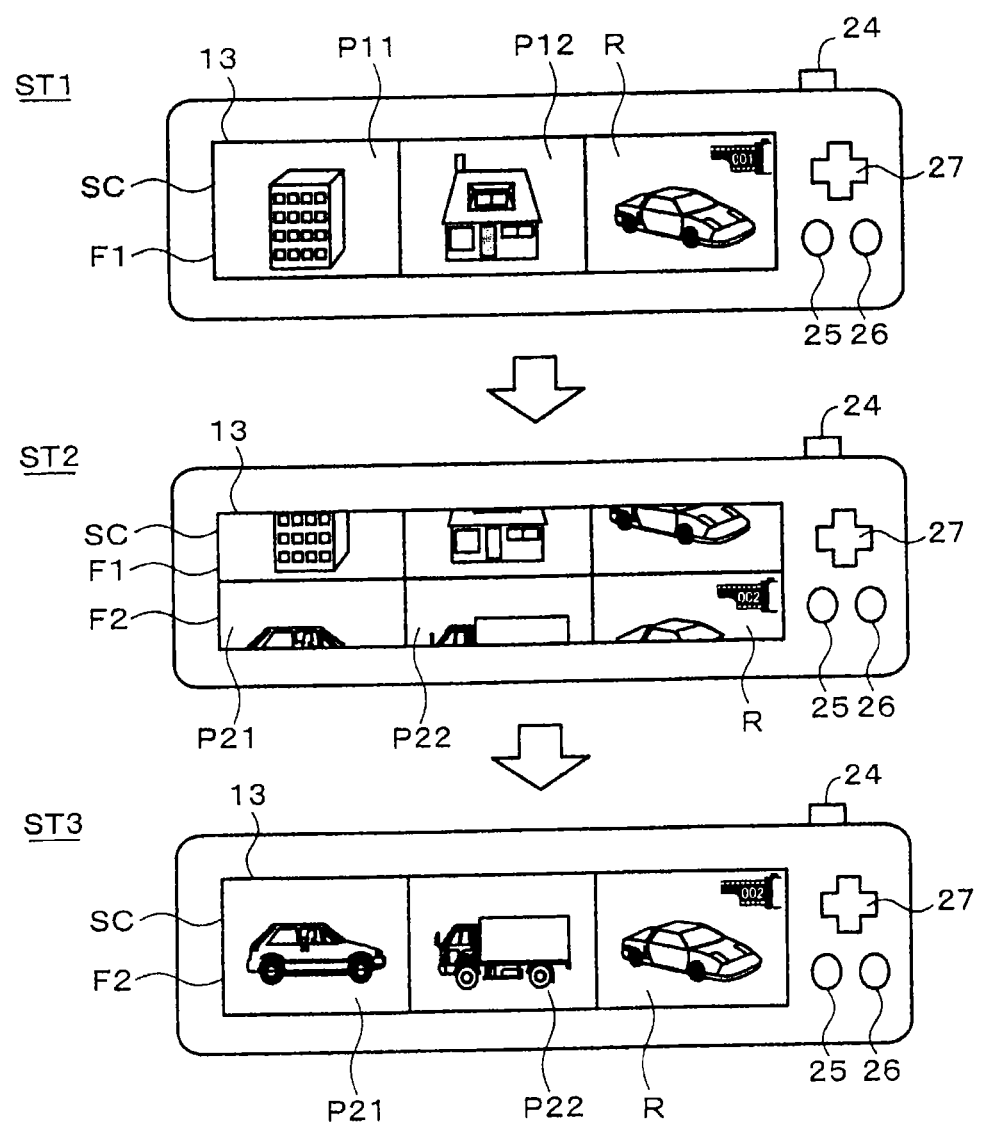
FIG. 4 is a schematic diagram showing transitions of display screens on a wide type LCD when folders are switched in the shooting mode.

Next, with reference to FIG. 4, a process of switching folders corresponding to a concept of films in a shooting mode will be described. As shown in FIG. 4, the LCD 13 having a wide display frame SC with an aspect ratio of (16:9) is disposed on the rear surface of the digital camera. Reference numeral 24 denotes a shutter button. Reference numeral 25 denotes a menu button. Reference numeral 26 denotes a delete button. Reference numeral 27 denotes the cross key.

A display screen ST1 at an upper illustration of FIG. 4 displays an icon of the folder F1 which indicates that the folder F1 has been selected. For example, the folder F1 is designated as a default folder which is initially selected when the power is turned on. Instead, a folder which was selected last time may be designated as a default folder which is initially selected. For example, the image files P11 and P12 are stored as captured reproduced images in the folder F1. The display frame SC displays a currently captured image R of an object through a lens, the image files P11 and P12, and the icon of the folder F1 at the same time. To allow the captured image R and the image files P11 and P12 to be easily distinguished, the size of the captured image R may be larger than the size of the image files P11 and P12. Instead, different icons may be added to images.

Data to be displayed are stored in the internal record medium 3. The captured image R is stored in the internal record medium 3. The captured image R is continuously updated at intervals of one frame in the shooting mode even if the operating section 9 is not operated. Besides the captured data R, OSD data are stored in the internal record medium 3. The OSD data are data of icons superimposed with the captured data R. Besides the icons, a plurality of image files for example P11 and P12 are displayed on the display frame. The image files P11 and P12 are read from the external record medium 11. The image files P11 and P12 are decoded and their sizes are reduced by the image processing section 4. Thereafter, the image files P11 and P12 are stored in the internal record medium 3. When the internal record medium 3 stores an image having the OSD indication size corresponding to an image which has been just captured, it is not necessary to read data from the external record medium 11.

The display screen ST1, which displays the captured image R, the image files P11 and P12, and the icon of the folder F1, is a display screen in a co-existent state of the shooting mode and the reproducing mode. In other words, when the shutter button 24 is pressed, a new image can be recorded. In addition, a desired image can be displayed as an image file. Thus, the user can determine a composition of an image to be shot while watching an image that he or she has just shot.

In the example shown in FIG. 4, since the captured image is a car, when the user switches the folder F1 to the folder F2, he or she presses the down button of the cross key 27. When the down button is pressed on the display screen ST1, it is switched to a display screen ST3 through a transition display screen ST2 as an animation. The transition display screen ST2 displays a state of which the recorded images are being switched from the folder F1 to the folder F2 and the number in the icon is changed although the captured image is not changed. The transition display screen ST2 momentarily appears.

After checking that the folder F1 was switched to the folder F2 with the icon on the display screen ST3, when the user presses the shutter button 24, the captured image R can be stored in the folder F2. When the shutter button 24 is pressed, animation transitions occur (not shown). In other words, the image files P22 and P23 (images of cars) of captured images and a newly captured image R are displayed on the display frame SC at the same time.

Figure 5:
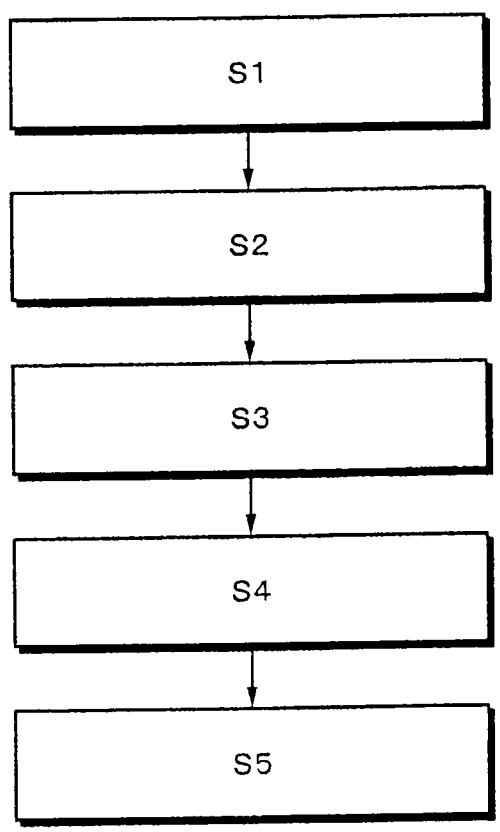
FIG. 5 is a flow chart showing a folder switching operation on a wide type LCD in the shooting mode.

FIG. 5 is a flow chart showing the foregoing operation. At step S1, the display screen ST1 shown in FIG. 4 displays the shooting mode of the folder F1. At step ST2, when the down key of the cross key 27 is pressed, a screen transition animation is displayed as the transition display screen ST2 of which the next folder F2 appears after the current folder F1 (at step ST3).

At step S4, an icon which denotes the current folder F2 is displayed. At step S5, the display screen ST3 shown in FIG. 4 displays the shooting mode of the folder F2.

When the down key of the cross key 27 is pressed, the folder F2 is switched to the folder F3. When the up key of the cross key 27 is pressed, the folder F2 is switched to the folder F1.

Figure 6:
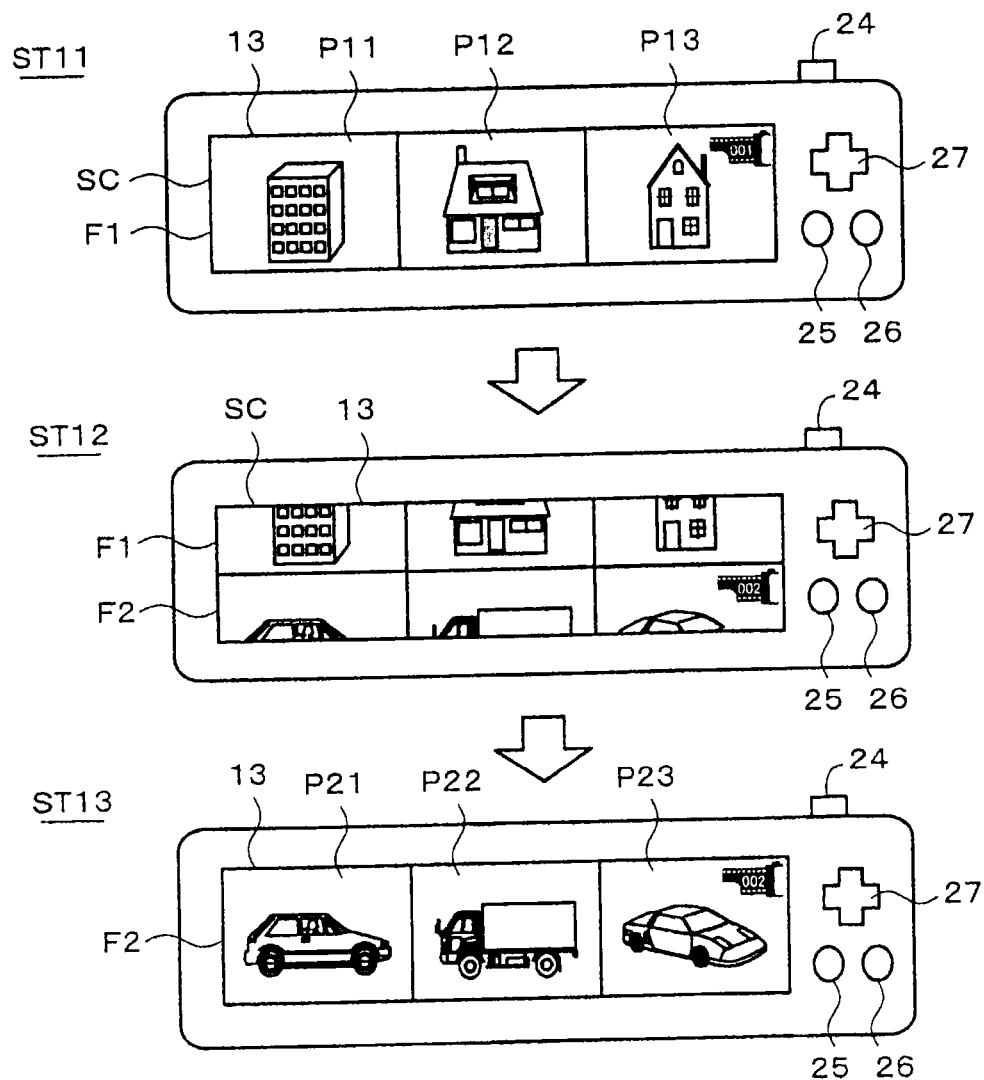
FIG. 6 is a schematic diagram showing transitions of display screens on a wide type LCD when folders are switched in the reproducing mode.

Next, with reference to FIG. 6, a folder switching operation using the cross key 27 in the reproducing mode will be described. A display screen ST11 at an upper illustration of FIG. 6 displays the icon of the folder F1, which indicates that the folder F1 has been selected. For example, the folder F1 is designated as a default folder which is initially selected when the power is turned on. Instead, a folder which was selected last time may be designated as a default folder which is initially selected. The folder F1 stores the image files P11, P12, and P13 as captured reproduced images.

As described above, data to be displayed are stored in the internal record medium 3. When the user wants to switch the folder F1 to the folder F2, he or she presses the down button of the cross key 27 on the display screen ST11. As a result, the display screen ST11 is switched to the display screen ST13 through the transition display screen ST12 as an animation. The transition display screen ST12 displays a state of which the recorded images are being switched from the folder F1 to the folder F2. The transition display screen ST12 momentarily appears. The display screen ST13 displays the icon of the folder F2 and the image files P21, P22, and P23 of the folder F2.

Figure 7:
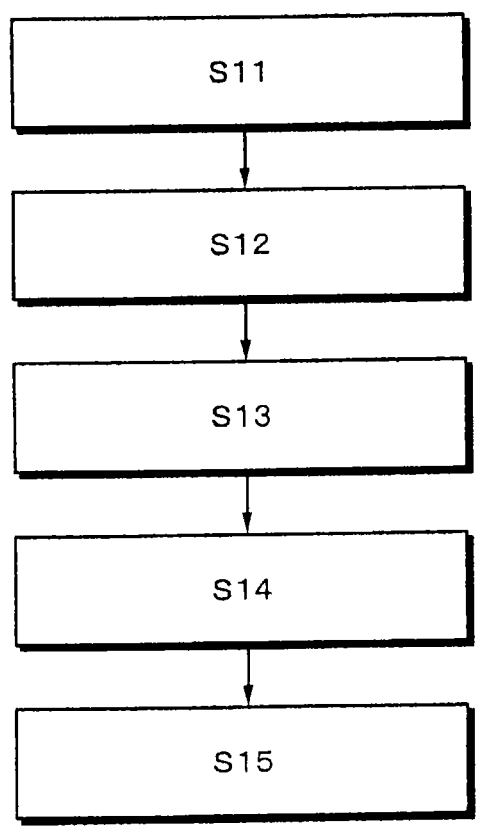
FIG. 7 is a flow chart showing a folder switching operation on a wide type LCD in the reproducing mode.

FIG. 7 is a flow chart showing the folder switching operation in the foregoing reproducing mode. At step S11, the display screen ST1 shown in FIG. 6 displays the reproducing mode of the folder F1. At step S12, when the down key of the cross key 27 is pressed, a screen transition animation is displayed (as the transition display screen ST12) of which the next folder F2 appears after the current folder F1 (transition display screen ST12) is displayed (at step S13).

At step S14, an icon which denotes the current folder F2 is displayed. At step S15, the display screen ST13 displays the reproducing mode of the folder F2.

When the down key of the cross key 27 is pressed, the folder F2 is switched to the folder F3. When the up key of the cross key 27 is pressed, the folder F2 is switched to the folder F1.

In the co-existent state of the shooting mode and the reproducing mode or in the reproducing mode, with the cross key 27, the size of a designated image file to be displayed can be enlarged or reduced. After the cursor is placed at a position of a desired image file (not shown) with the cross key 27, when a size enlargement button or a size reduction button (a mechanical button or a button on the GUI) is operated, the size of the selected image file can be enlarged or reduced, respectively.

Figure 8:
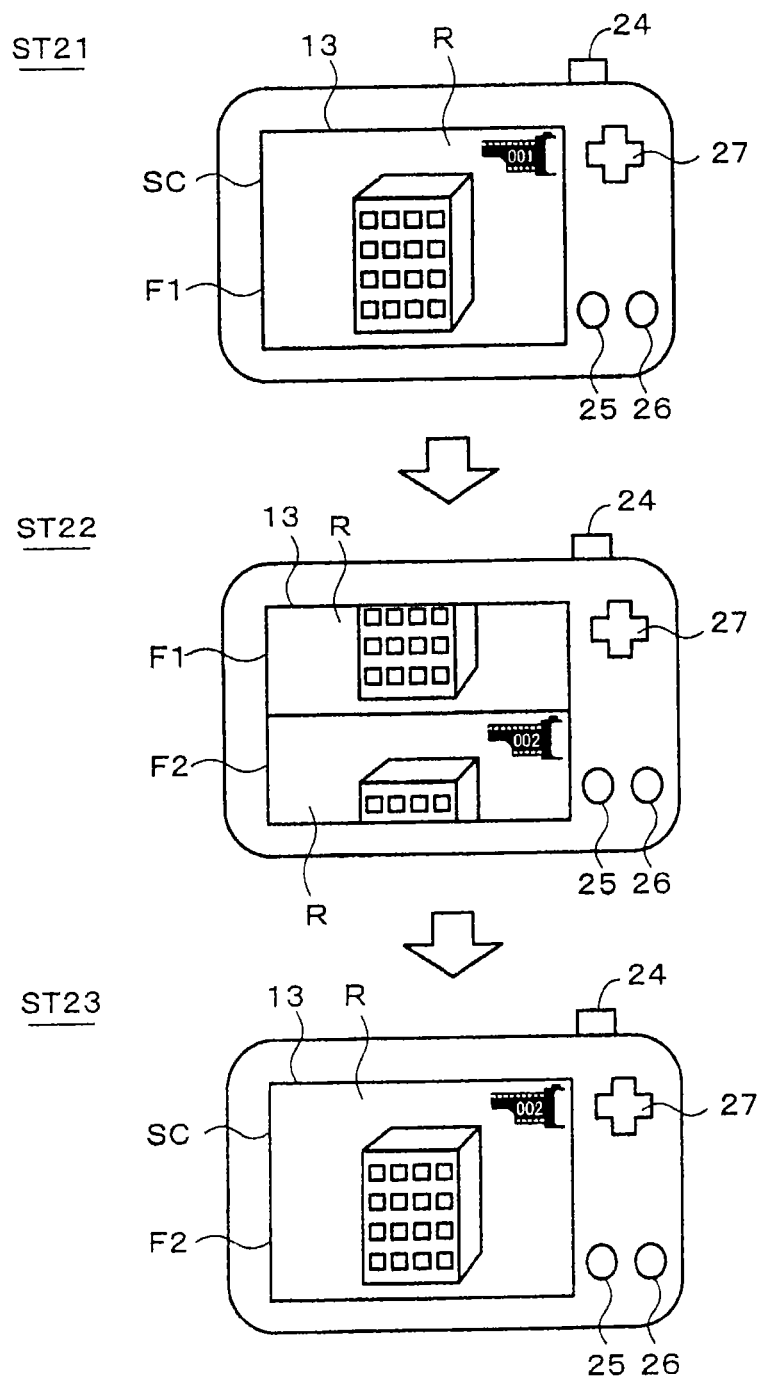
FIG. 8 is a schematic diagram showing transitions of display screens on an LCD having an aspect ratio of (4:3) when folders are switched in the shooting mode.

In the foregoing description, the LCD 13 which has a wide type display frame SC with an aspect ratio of (16:9) is used, an LCD 13 which has a display frame SC with an aspect ratio of (4:3) may be used. FIG. 8 shows transitions of display screens in the shooting mode when an LCD 13 which has a display frame SC with an aspect ratio of (4:3) is used.

A display screen ST21 at an upper illustration of FIG. 8 displays an icon of the folder F1 which indicates that the folder F1 has been selected. For example, the folder F1 is designated as a default folder which is initially selected when the power is turned on. Instead, a folder which was selected last time may be designated as a default folder which is initially selected. An image R of an object which is currently captured through a lens is displayed on a display frame SC. Because of the limited size of the display frame SC, captured image files are not displayed at the same time. However, if the size of the captured image R is reduced, captured image files may be displayed at the same time.

Data to be displayed are stored in the internal record medium 3. The captured image R is stored in the internal record medium 3. The captured image R is continuously updated at intervals of one frame in the shooting mode even if the operating section 9 is not operated. Besides the captured data R, OSD data are stored in the internal record medium 3. The OSD data are data of icons superimposed with the captured data R. When the internal record medium 3 stores an image having the OSD indication size corresponding to an image which has been just captured, it is not necessary to read data from the external record medium 11. The display screen ST21 displays the currently captured image R in the shooting mode. When the shutter button 24 is pressed, a new image can be recorded.

The user knows that the current folder is F1 because of the icon which is displayed. Thereafter, the user presses the down button of the cross key 27. When the down button is pressed on the display screen ST21, it is switched to a display screen ST23 through a transition display screen ST22 as an animation. The transition display screen ST22 displays a state of which the number in the icon is changed from the folder F1 to the folder F2 although the captured image is not changed. The transition display screen ST22 momentarily appears.

After checking that the icon number was changed from the folder F1 to the folder F2 on the display screen ST23, when the user presses the shutter button 24, the captured image can be stored.

Figure 9:
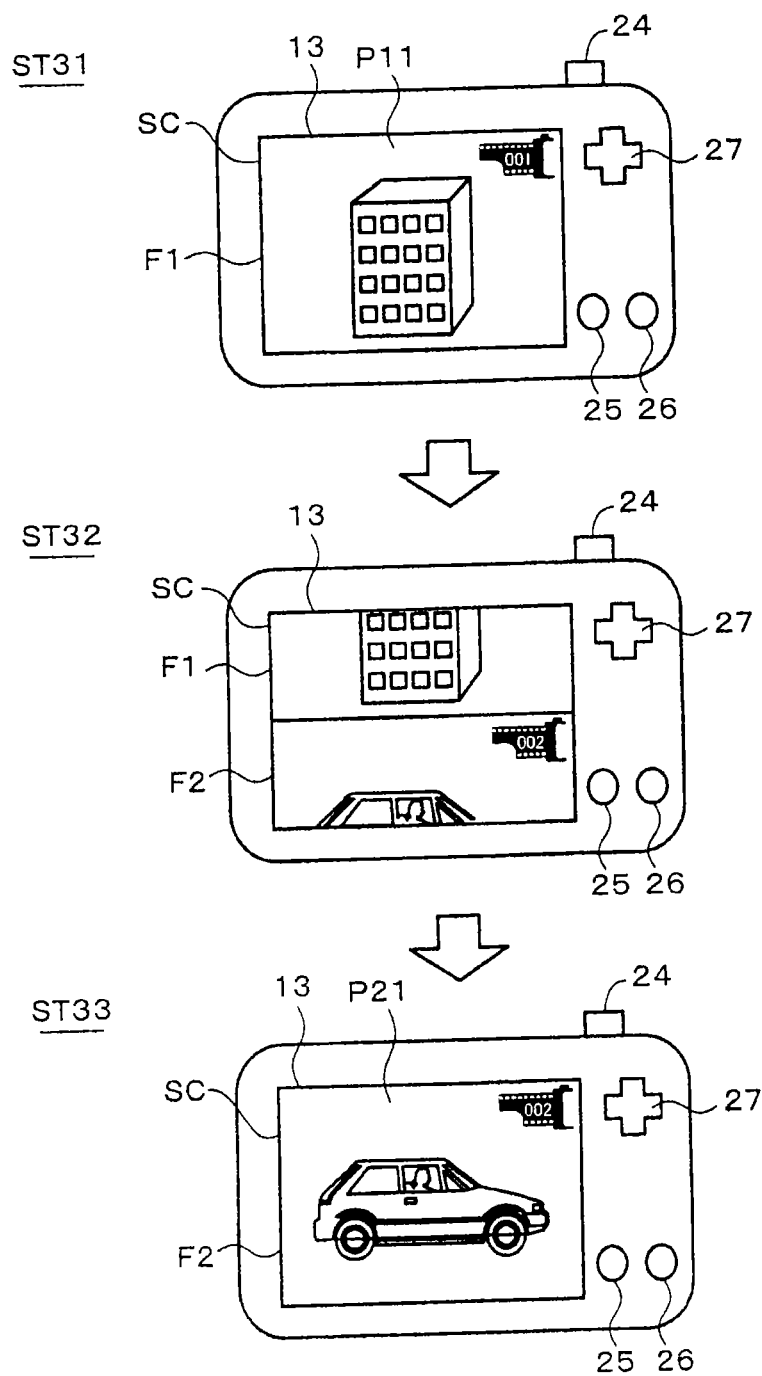
FIG. 9 is a schematic diagram showing transitions of display screens on an LCD with an aspect ratio of (4:3) when folders are switched in the reproducing mode.

FIG. 9 shows a folder switching operation using the cross key 27 in the reproducing mode. A display screen ST31 at an upper illustration of FIG. 9 displays the icon of the folder F1, which indicates that the folder F1 has been selected. For example, the folder F1 is designated as a default folder which is initially selected when the power is turned on. Instead, a folder which was selected last time may be designated as a default folder which is initially selected. The folder F1 stores an image P11 as a captured reproduced image.

As described above, data to be displayed are stored in the internal record medium 3. When the user wants to switch the folder F1 to the folder F2, he or she presses the down button of the cross key 27 on the display screen ST31. As a result, the display screen ST31 is switched to the display screen ST33 through the transition display screen ST32 as an animation. The transition display screen ST32 displays a state of which the recorded image is being switched from the folder F1 to the folder F2. The transition display screen ST32 momentarily appears. The display screen ST33 displays the icon of the folder F2 and the image file P21 of the folder F2.

In the foregoing description, when a captured image file is reproduced, a folder corresponding to a film is designated. In addition, a single-folder reproducing mode may be switched to an all-folder reproducing mode.

Figure 10:
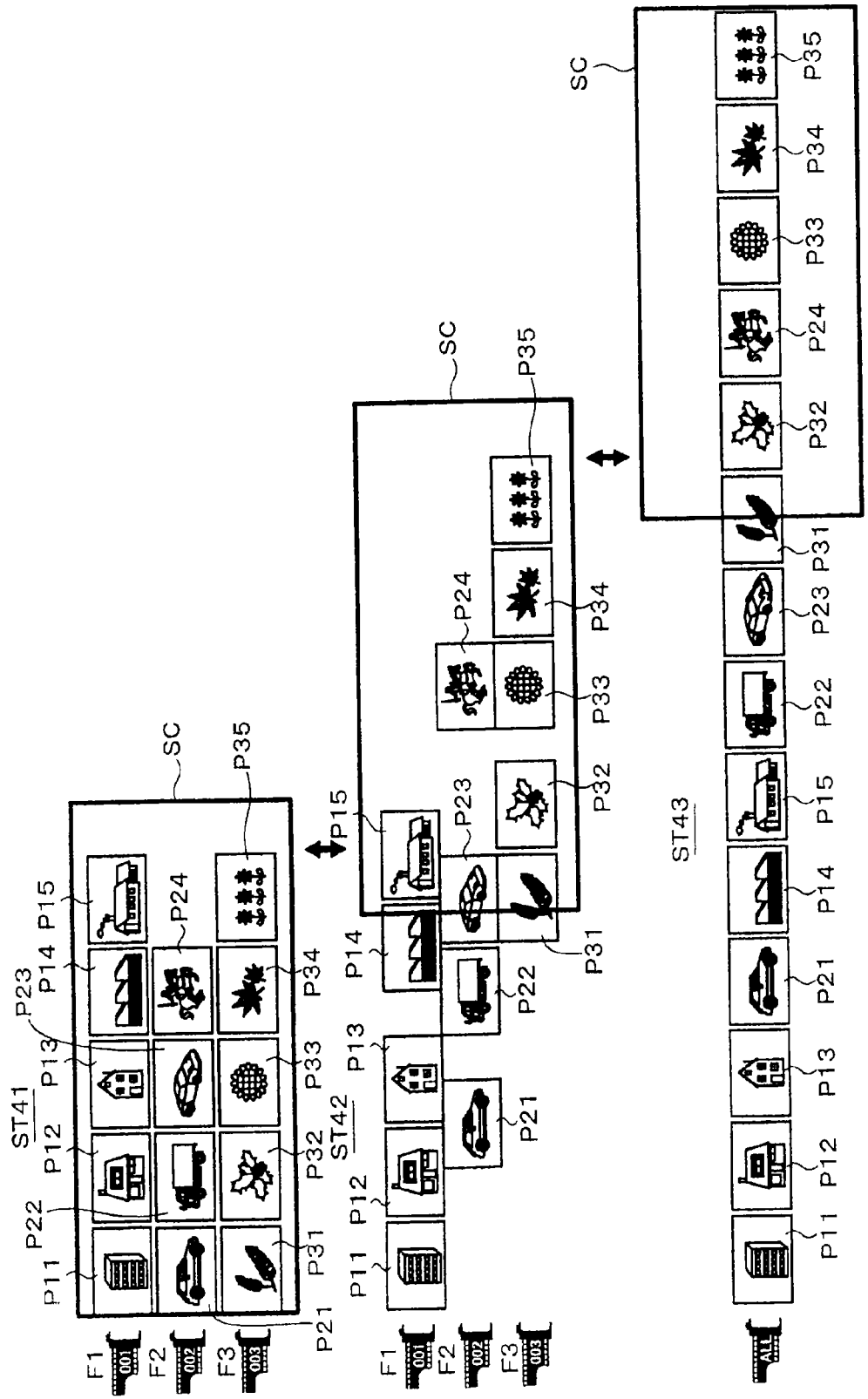
FIG. 10 is a schematic diagram showing transitions of display screens when a single-folder reproducing mode is switched to an all-folder all-image file reproducing mode.

In FIG. 10, image files of each of the folders F1, F2, and F3 are successively displayed on the display frame SC. FIG. 10 shows a set of image files stored in for example one removable record medium (which is a memory card or the like). Instead of all image files displayed at the same time, as was described above, image files of one folder may be displayed at the same time. In this case, folders of image files to be displayed may be switched. A display screen ST41 is switched to an all-folder display screen ST43 through a transition display screen ST42.

Image files of each folder are arranged from one having the oldest shooting date and time to one having the latest shooting date and time corresponding to additional data of shooting date and time added to each image file. On the display screen ST43, which displays image folders of all folders, all image files are rearranged along the time axis. The transition display screen ST42 displays a state of which all image files are being rearranged along the time axis.

The display screen ST43 displays all image files arranged on one time axis. The display frame SC displays the latest image file P35 and older image files P34, P33, P24, and P32 at the same time. The number of images files which the display frame SC can display depends on the size thereof. When the left key (or right key) of the cross key is operated, image files which are displayed can be scrolled in the newer to older direction (or older to newer direction).

Figure 11:
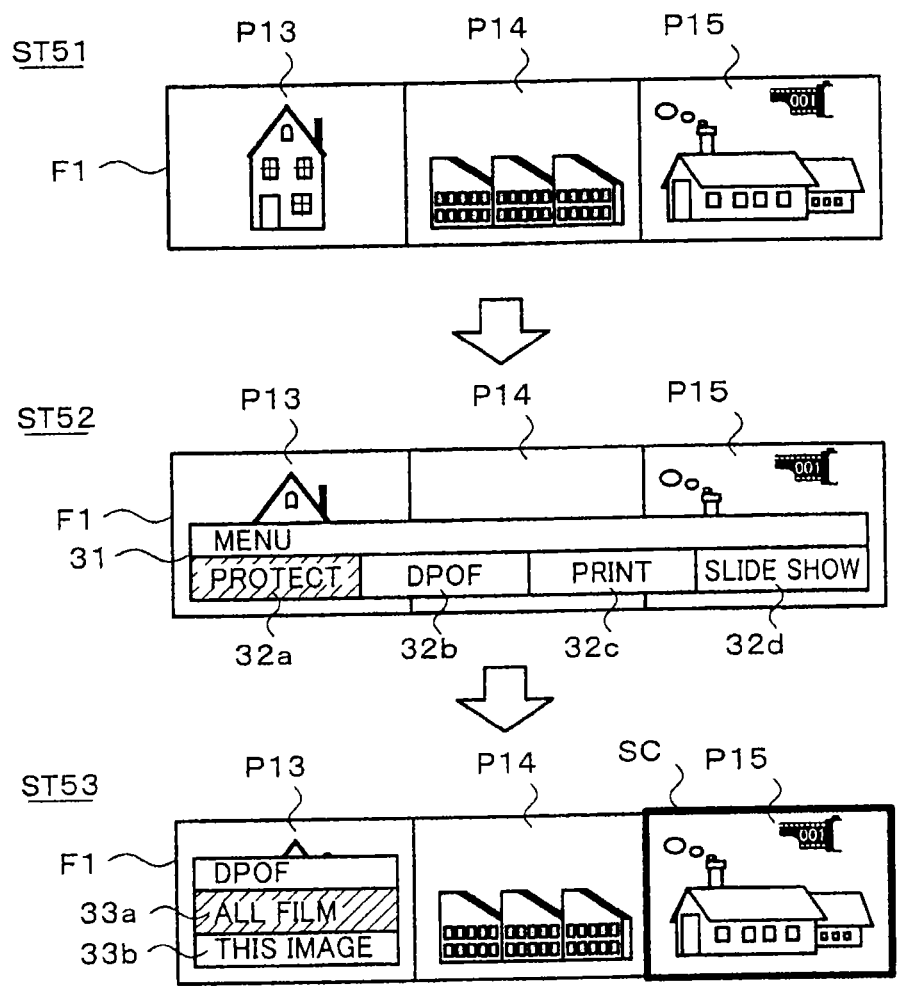
FIG. 11 is a schematic diagram showing transitions of display screens when a reproduction menu is displayed and executed in the reproducing mode.

FIG. 11 shows examples of transitions of display screens when the menu button 25 is pressed in the reproducing mode. A display screen ST51 displays for example the image files P13, P14, and P15 of the folder F1 on the display frame of the wide type LCD. In this state, when the menu button 25 is pressed, a display screen ST52 appears. The display screen ST52 displays a reproduction menu screen 31 on the display frame SC.

The menu screen 31 is a screen on which one of four menu options which are protect 32*a*, DPOF 32*b*, print 32*c*, and slide show 32*d* is selected. When the left or right key of the cross key 27 is pressed, a desired menu option can be selected. A selected menu option is displayed in a focused state or in a highlighted state.

The protect 32*a* is a menu option with which an update is prohibited. The DPOF 32*b* is a menu option with which an image to be printed is designated. The print 32*c* is a menu option with which a print command is issued to a printer connected to the camera through a USB (Universal Serial Bus). The slide show 32*d* is a menu option with which captured images are successively reproduced. These menu options can be designated for not only each image file, but each folder.

When the DPOF 32*b* is selected on the menu screen 31 and then an enter button is pressed, a display screen ST53 appears. The display screen ST53 displays a menu option 33*a* which designates all the file and a menu option 33*b* which designates the current image file. With the up key or down key of the cross key 27 and the enter button, one of these menu options is selected. When the image file is designated, the cursor SC is placed at the selected image file. Since DPOF can be designated for each folder, the apparatus according to the present invention can be more easily operated than a digital camera which does not allow DPOF to be designated for each folder, but each image file.

The present invention is not limited to the foregoing embodiment. Instead, various modifications and applications may be made without departing from the spirit and scope of the present invention. For example, according to the present invention, with the left key and right key as directional keys, folders may be switched. With the up key and down key as directional keys, image files may be switched. Besides the cross key, an input device which can designate directions may be used. In addition, the present invention is not limited to a digital camera which records a still image. In other words, the present invention may be applied to an imaging apparatus which can record a moving picture and an imaging apparatus which can record both a still image and a moving picture.

When a moving picture is recorded, the top image may be displayed on the LCD or the like.

The invention claimed is:

1. An electronic apparatus, comprising:
display circuitry configured to
control display of images in a first folder and a second folder, and
control the display of the images so that a screen displaying a plurality of different images from the first folder in a first direction is switched to a screen displaying a plurality of different images from the second folder in the first direction in response to a signal, the switching of screens being intermediated by an animated transition displayed in a second direction perpendicular to the first direction, the animated transition simultaneously representing at least partial images of the plurality of different images on the first folder and the plurality of different images in the second folder,
wherein the display circuitry is further configured to control display of a currently-captured image during the animated transition.

2. The electronic apparatus according to claim 1, wherein the plurality of different images in the first folder and the plurality of different images in the second folder are displayed along a time axis.

3. The electronic apparatus according to claim 2, wherein the circuitry is further configured to control display of an icon corresponding to one of the first and second folders to indicate that the first and second folders are switched.

4. The electronic apparatus according to claim 2, wherein images displayed on a right side of the time axis are more recent than images displayed on a left side of the time axis.

5. The electronic apparatus according to claim 3, wherein the icon is embedded in the currently-captured image.

6. The electronic apparatus according to claim 3, wherein the icon is embedded into one of the first and second screens.

7. The electronic apparatus according to claim 6, wherein the icon includes a folder number corresponding to the first folder when the first screen is displayed and the icon includes a number corresponding to the second folder when the second screen is displayed.

8. The electronic apparatus according to claim 1, wherein the currently-captured image maintains a same location on the time axis during the animated transition.

9. The electronic apparatus according to claim 8, wherein a location of the currently-captured image one the time axis is a right-most location.

10. The electronic apparatus according to claim 3, wherein icon is a folder.

11. The electronic apparatus according to claim 3, wherein the icon is a film roll.

12. The electronic apparatus according to claim 1, wherein a size of the currently-captured image is different from a size of the plurality of different images in the first folder and a size of the plurality of different images of the second folder.

13. The electronic apparatus according to claim 12, wherein the currently-captured image is larger than the plurality of different images in the first folder and the plurality of different images in the second folder.

14. The electronic apparatus according to claim 1, wherein the circuitry is further configured to display only images from the plurality of different images of the first folder and images from the plurality of different images in the second folder when in a reproduction mode.

15. The electronic apparatus according to claim 13, wherein only the currently-captured image is displayed when the size of the currently-captured image is larger than the size of the plurality of different images in the first folder and the size of the plurality of different images in the second folder.

16. The electronic apparatus according to claim 15, wherein the icon is embedded in the currently-captured image and indicates a currently-selected folder.

17. The electronic apparatus according to claim 16, wherein the animated transition causes simultaneous display of different portions of the currently captured image as the first and second folders are switched when the currently-captured image is larger than the plurality of different images in the first folder and the plurality of different images in the second folder.

18. a method for an electronic apparatus, comprising:
controlling, with circuitry, display of images in a first folder and a second folder,
control, with the circuitry, the display of the images so that a screen displaying a plurality of different images from the first folder in a first direction is switched to a screen displaying a plurality of different images from the second folder in the first direction in response to a signal, the switching of screens being intermediated by an animated transition displayed in a second direction perpendicular to the first direction, the animated transition simultaneously representing at least partial images of the plurality of different images on the first folder and the plurality of different images in the second folder, and
controlling display of a currently-captured image during the animated transition.

19. A non-transitory computer-readable medium encoded with computer-readable instructions thereon, the computer-readable instruction when executed by a computer cause the computer to perform a method comprising:
controlling display of images in a first folder and a second folder,
control the display of the images so that a screen displaying a plurality of different images in the first folder in a first direction is switched to a screen displaying a plurality of different images in the second folder in the first direction in response to a signal, the switching of screens being intermediated by an animated transition displayed in a second direction perpendicular to the first direction, the animated transition simultaneously representing at least partial images of the plurality of different images on the first folder and the plurality of different images in the second folder, and
controlling display of a currently-captured image during the animated transition.

* * * * *